(12) United States Patent
Fair et al.

(10) Patent No.: US 8,460,053 B2
(45) Date of Patent: Jun. 11, 2013

(54) TOY ATTACHMENT SYSTEMS AND METHODS

(75) Inventors: Paul Fair, Denver, CO (US); Kristin A. Tidwell, Denver, CO (US); Catherine P. McNeil, Golden, CO (US); Clarice Bonzer, Littleton, CO (US)

(73) Assignee: The Boppy Company, LLC, Golden, CO (US)

(*) Notice: Subject to any disclaimer, the term of this patent is extended or adjusted under 35 U.S.C. 154(b) by 665 days.

(21) Appl. No.: 12/619,481

(22) Filed: Nov. 16, 2009

(65) Prior Publication Data

US 2011/0117808 A1 May 19, 2011

(51) Int. Cl.
*A63H 33/00* (2006.01)

(52) U.S. Cl.
USPC .............................................. 446/227; 5/655

(58) Field of Classification Search
USPC .......... 446/227, 71–77, 901, 369, 268; 5/655; 248/71, 546; 135/96, 136, 137, 125, 126
See application file for complete search history.

(56) References Cited

U.S. PATENT DOCUMENTS

| | | | | |
|---|---|---|---|---|
| 2,723,856 A * | 11/1955 | Thomson | ...................... | 482/130 |
| 2,831,538 A * | 4/1958 | Lishman | ...................... | 160/330 |
| 3,365,198 A * | 1/1968 | Hay | ...................... | 273/157 R |
| 3,994,102 A * | 11/1976 | Johnson et al. | ................. | 52/2.21 |
| 4,040,126 A * | 8/1977 | Cecil | ............... | 2/161.5 |
| 4,188,745 A * | 2/1980 | Harvey et al. | ................. | 446/227 |
| 4,542,714 A * | 9/1985 | Ingraham et al. | ............. | 119/708 |
| 4,594,072 A * | 6/1986 | Cowell | .......................... | 446/227 |
| 4,627,588 A * | 12/1986 | Block | ......................... | 248/163.2 |
| 4,654,991 A * | 4/1987 | Jones | ............................ | 40/617 |
| 4,702,719 A * | 10/1987 | Lapid | ............................ | 446/227 |
| 4,722,713 A * | 2/1988 | Williams et al. | ............. | 446/227 |
| 4,737,129 A * | 4/1988 | Gorley et al. | ................... | 446/72 |
| 4,954,114 A * | 9/1990 | Kawashima | .................... | 446/75 |
| 5,045,871 A * | 9/1991 | Reinholdson | ..................... | 396/6 |
| 5,150,504 A * | 9/1992 | Cohen | ............................. | 24/302 |
| 5,187,826 A * | 2/1993 | Mariol | ............................. | 5/655 |

(Continued)

FOREIGN PATENT DOCUMENTS

| | | | |
|---|---|---|---|
| DE | 4134439 A1 * | 4/1993 | |
| WO | 2009/098678 A2 | 8/2009 | |

OTHER PUBLICATIONS

Bebe Chic Products, http://www.bebechic.com/strollers.asp, downloaded Aug. 24, 2010, 1 page.

(Continued)

*Primary Examiner* — Gene Kim
*Assistant Examiner* — Urszula M Cegielnik
(74) *Attorney, Agent, or Firm* — Kilpatrick Townsend & Stockton LLP

(57) ABSTRACT

Systems and methods enable attaching toys or other items to child care equipment such as a play gyms, swings, bouncers, changing pads, and the like. Attachment is accomplished by passing a compressible portion of the item to be attached through an opening in the child care equipment. The opening may be provided by a hole in the equipment, or by a hole in a clip engaged with a rod embedded in or attached to the equipment. The clip may slide along the rod to adjust the position of the item. In one application, rods embedded in a play gym provide a structural support for a canopy of the play gym, and also may receive clips for attaching toys or other items to the play gym.

29 Claims, 9 Drawing Sheets

U.S. PATENT DOCUMENTS

| | | | | |
|---|---|---|---|---|
| 5,546,620 | A * | 8/1996 | Matthews | 5/655 |
| 5,702,039 | A * | 12/1997 | Olaiz | 224/409 |
| 5,928,054 | A * | 7/1999 | Mast | 446/227 |
| 5,930,854 | A * | 8/1999 | O'Neill et al. | 5/655 |
| 6,003,213 | A * | 12/1999 | Keller et al. | 24/635 |
| 6,016,926 | A * | 1/2000 | Smith et al. | 211/119.011 |
| 6,036,263 | A | 3/2000 | Gold | |
| 6,142,565 | A | 11/2000 | Rieder | |
| 6,168,494 | B1 * | 1/2001 | Engel et al. | 446/477 |
| 6,178,978 | B1 * | 1/2001 | Rieber | 135/96 |
| 6,321,403 | B1 | 11/2001 | Matthews | |
| 6,357,462 | B1 * | 3/2002 | Laosunthara et al. | 135/96 |
| 6,374,468 | B1 * | 4/2002 | Cardwell et al. | 24/584.1 |
| 6,428,098 | B1 | 8/2002 | Allbaugh | |
| 6,436,125 | B1 * | 8/2002 | Rhoads | 606/234 |
| 6,439,947 | B1 * | 8/2002 | Lehavi | 446/101 |
| 6,491,563 | B1 * | 12/2002 | Bailey | 446/122 |
| 6,592,425 | B2 * | 7/2003 | Bapst et al. | 446/227 |
| 6,684,422 | B2 * | 2/2004 | LeFevre et al. | 5/496 |
| 6,752,457 | B2 | 6/2004 | Gold et al. | |
| 6,860,786 | B2 * | 3/2005 | Oren et al. | 446/227 |
| 6,938,958 | B2 | 9/2005 | Gold et al. | |
| 6,966,089 | B2 | 11/2005 | Gold et al. | |
| 7,037,170 | B2 * | 5/2006 | Pacella et al. | 446/268 |
| 7,086,545 | B2 * | 8/2006 | Mannion et al. | 211/181.1 |
| 7,096,874 | B2 * | 8/2006 | Forshpan | 135/96 |
| 7,201,177 | B2 * | 4/2007 | Anticoli et al. | 135/125 |
| 7,311,357 | B2 | 12/2007 | Gold et al. | |
| 7,374,240 | B2 | 5/2008 | Gold et al. | |
| 7,376,993 | B2 * | 5/2008 | Myers et al. | 5/655 |
| 7,430,765 | B2 | 10/2008 | Brown et al. | |
| 7,588,291 | B2 | 9/2009 | Gold et al. | |
| 7,624,461 | B2 * | 12/2009 | Tidwell et al. | 5/655 |
| 7,762,413 | B2 * | 7/2010 | Song | 215/11.6 |
| 2001/0038203 | A1 * | 11/2001 | Henderson et al. | 281/51 |
| 2004/0052579 | A1 * | 3/2004 | Draggoo et al. | 403/326 |
| 2004/0063381 | A1 * | 4/2004 | Norman | 446/227 |
| 2004/0232756 | A1 | 11/2004 | Lin | |
| 2004/0242118 | A1 | 12/2004 | Schreiber-Setzemski et al. | |
| 2004/0266312 | A1 * | 12/2004 | Oren et al. | 446/227 |
| 2005/0235425 | A1 | 10/2005 | Parrilla | |
| 2006/0199467 | A1 * | 9/2006 | Snyder | 446/227 |
| 2006/0232112 | A1 | 10/2006 | Karr | |
| 2006/0264148 | A1 * | 11/2006 | Sejnowski et al. | 446/227 |
| 2007/0087657 | A1 * | 4/2007 | Campbell et al. | 446/482 |
| 2007/0178799 | A1 * | 8/2007 | Rudell et al. | 446/120 |
| 2008/0248713 | A1 * | 10/2008 | Mulrine et al. | 446/227 |
| 2008/0258437 | A1 | 10/2008 | Ryan et al. | |
| 2009/0253342 | A1 * | 10/2009 | Oren et al. | 446/227 |
| 2012/0100776 | A1 * | 4/2012 | Jackson et al. | 446/227 |

OTHER PUBLICATIONS

Boo Yah Baby—Stroller Liners, http://booyahbaby.com/Stroller-Liners/, downloaded Aug. 24, 2010, 4 pages.

Bumbleride—The ride of Your Life, http://www.bumbleride.com/strollers/footmuff.php, downloaded Aug. 24, 2010, 1 page.

Clean Shopper Shopping Cart Covers, http://www.cleanshopper.com/static.php?page=shopping_cart_covers, downloaded Aug. 24, 2010, 3 pages.

Eddie Bauer Reversible Stroller Liner, http://www.target.com/dp/B0033A42L2/ref=gp_se_search-results-asin-redirect, downloaded Aug. 24, 2010, 2 pages.

Eddie Bauer Shopping Cart Cover, http://www.toysrus.com/product/index.jsp?productid=3697563, downloaded Aug. 24, 2010, 2 pages.

Floppy Seat Shopping Cart Cover and Restaurant High Chair Cover for Babies, http://www.floppyseat.com/index.html, downloaded Aug. 24, 2010, 3 pages.

Infantino, http://www.infantino.com/ShoppingCartCovers/ShoppingCartCovers.php, downloaded Aug. 24, 2010, 1 page.

Koochy-Kooz, Cozy Stroller Liners, http://koochykooz.com/main.html, downloaded Aug. 24, 2010, 4 pages.

Luxury Stroller Liners/Stroller Pads, http://www.tivolicoutre.com/Luxury-Stroller-Liners-Stroller-Pads.htm, downloaded Aug. 24, 2010, 2 pages.

myMonkeymoo—Stroller Pads, http://mymonkeymoo.com/stroller-pads.html, downloaded Aug. 24, 2010, 1 page.

Prop 'R Shopper, http://leachco.stores.yahoo.net/proprshopper.html, downloaded Aug. 24, 2010, 1 page.

Pure Joy Collection—Stroller Liners, http://purejoycollection.com/Stroller_Liners.html, downloaded Aug. 24, 2010, 3 pages.

International Search Report and Written Opinion of PCT/IB2010/002673 mailed on Oct. 6, 2011, 16 pages.

* cited by examiner

TOY ATTACHMENT SYSTEMS AND METHODS

BACKGROUND OF THE INVENTION

Various kinds of equipment and accessories have been developed for facilitating the care of infants and young children. While safety is of primary importance, it is also desirable that child care equipment contribute to the mental and physical development of the child, provide stimulation and entertainment for the child, and be convenient to use.

BRIEF SUMMARY OF THE INVENTION

In one embodiment, a child care equipment system comprises a piece of child care equipment including an arched support having a frame and a surface sheet coupled to the frame, an opening in the piece of child care equipment, and an item to be attached to the piece of child care equipment. The item includes a main body larger than the opening and a compressible member connected to the main body. The compressible member is larger than the opening when the compressible member is in an uncompressed state, and the compressible member is configured to be compressible to a size smaller than the opening so that the compressible member can be passed through the opening to place the compressible member and the main body on opposite sides of the opening. The main body and the compressible member may be connected by a tether, wherein when the compressible member and the main body are on opposite sides oldie opening, the tether passes through the opening. The opening may be formed by a loop of fabric sewn into the piece of child care equipment. The opening may be formed by a loop of stretchable material affixed to the piece of child care equipment. The opening may be a hole through a portion of the child care equipment.

In some embodiments, the arched support frame further comprises a semi-rigid rod embedded in the surface sheet and an essentially rigid clip slidingly engaged with the semi-rigid rod, the clip having a through hole. The piece of child care equipment may be a play gym, a play yard, a playpen, a swing, a baby bouncer, stroller, a changing pad or a changing pad cover. The compressible member may have a shape selected from the group of shapes consisting of a ball shape, a block shape, a pyramid shape or other geometric shape, a button shape, a shape reminiscent of leaves or a flower, animal shapes, and a shape reminiscent of wings. The item to be attached may comprise a toy, a doll, a ball, a block, a pyramid or other geometric shape, a mirror, a teething ring, a toy shaped like an animal or insect, a toy shaped like a plant or flower, or an item that generates sound, light, vibration, or a combination of those features.

In some embodiments, the opening is a first opening, the item to be attached is a first item to be attached, and the compressible member is a first compressible member, and the first item to be attached comprises a second opening configured for attachment of a second item to the first item by passage, through the second opening, of a second compressible member comprised in the second item. In some embodiments, the item to be attached is a first item, and the system further comprises a second item, the first and second items both being attached to the piece of child care equipment via the same opening. For example, the toys can be linked together to form a chain of toys. In some embodiments, the system further comprises a pad coupled to the arched support frame.

In another embodiment, apiece of child care equipment comprises a semi-rigid rod or track that is embedded within or otherwise to the piece of child care equipment and a substantially rigid clip slidingly engaged with the rod or track. The clip comprises an opening for attaching an item to the piece of child care equipment. The semi-rigid rod may be wrapped in a fabric covering or sleeve sewn into the piece of child care equipment such that the substantially rigid clip may slide over the fabric covering. In other embodiments, the track may be coupled to a portion of the equipment, such as to a fabric that covers a mat, a blanket, a seat cover, or the like. The entire track may be held within a fabric sleeve that is sewn to a seam of the piece of equipment, with the clip sliding over the sleeve. Alternatively, at least a portion of the track may be exposed so that the clip can slide over the bare track. The piece of child care equipment may be a play gym, a play yard, a playpen, a swing, a baby bouncer, a shopping cart liner, a stroller, a car seat, a booster seat, a play pad, a high chair, a changing pad or a changing pad cover. The clip may be generally toroidal and comprise a slotted passage through one side attic clip, the slotted passage configured to slidingly engage the semi-rigid rod.

In some embodiments, a piece of child care equipment is combined with an item to be attached to the piece of child care equipment. In these embodiments, the item comprises a main body larger than the opening in the clip, and the item includes a compressible member connected to the main body. The compressible member is larger than the opening when the compressible member is in an uncompressed state, and the compressible member is configured to be compressible to a size smaller than the opening so that the compressible member can be passed through the opening to place the compressible member and the main body on opposite sides of the opening.

In another embodiment a play gym for a child comprises a base pad and a canopy. The base pad includes at least three compressible members spaced apart and affixed to an edge portion of the base pad. The canopy has at least three legs and is configured to arch over the base pad. The canopy also comprises a surface sheet and at least first and second semi-rigid rods embedded in the surface sheet. Each semi-rigid rod has a respective first end and a respective second end. The first ends of the first and second rods follow a first of the at least three legs, the second end of the first rod follows a second of the at least three legs, and the second end of the second rod follows a third of the at least three legs. The canopy further comprises a respective canopy attachment loop at an end of each leg, each canopy attachment loop configured to engage one of the at least three compressible members to attach the canopy to the base pad. Each canopy attachment loop may be stretchable. Each canopy attachment loop may be smaller than its corresponding compressible member when the loop is in an unstretched state and the compressible member is in an uncompressed state. The play gym may further comprise an opening configured to accept a portion of an item to be attached to the play gym. The opening may be formed by a hole in the surface sheet. The opening may be formed by an item attachment loop of fabric sewn into either the surface sheet or the base pad. The opening may be formed by a hole through a substantially rigid clip, the clip slidingly engaged with one of the semi-rigid rods. In some embodiments, the play gym is combined with an item attached to the play gym. The attached item may comprise a toy, a doll, a ball, a block, a pyramid or other geometric shape, a mirror, a teething ring, a toy shaped like an animal or insect, a toy shaped like a plant or flower, or an item that generates sound, light, vibration, or a combination of those features. In some cases, the base pad may also include one or more tracks and one or more clips may be slidingly attacked to the tracks. In this way, an item may be slidingly coupled to the base pad by coupling the toy to the clip, such as by introducing a compressible member of the toy through an opening in the clip.

In another embodiment, a method of attaching an item to a piece of child care equipment comprises compressing a compressible member connected to a main body of the item, passing the compressible member through an opening in a clip slidingly engaged with a semi-rigid rod embedded in or otherwise attached to the piece of child care equipment such that the compressible member and main body are on opposite sides of the opening, allowing the compressible member to expand to a size larger than the opening, and sliding the clip along the semi-rigid rod to position the item to be accessible to a child using the piece of child care equipment. The piece of child care equipment may be a play gym, a play yard, a playpen, a swing, a baby bouncer, a shopping cart liner, a stroller, a car seat, a booster seat, a play pad, a high chair, a changing pad or a changing pad cover. The item may comprise a toy, a doll, a ball, a block, a pyramid or other geometric shape, a mirror, a teething ring, a toy shaped like an animal or insect, a toy shaped like a plant or flower, and an item that generates sound, light, vibration, or a combination of those features.

In another embodiment, an item for attachment to a piece of child care equipment comprises a main body, a compressible member, and a tether connecting the main body with the compressible member. The compressible member is configured to be compressed to pass through an opening in the child care equipment and allowed to re-expand, such that the main body and compressible member are on opposite sides of the opening. The item may comprise a toy, a doll, a ball, a block, a pyramid or other geometric shape, a mirror, a teething ring, a toy shaped like an animal or insect, a toy shaped like a plant or flower, or an item that generates sound, light, vibration or a combination of those features. The compressible member may have a shape selected from the group of shapes consisting of a ball shape, a block shape, a pyramid shape or other geometric shape, a button shape, a shape reminiscent of leaves or a flower, an animal shape, and a shape reminiscent of wings. In some embodiments, the compressible member is a first compressible member, and the item further comprises a second compressible member connected to the main body, the second compressible member also configured to be compressed to pass through the same or a different opening in the child care equipment and allowed to re-expand, such that the main body and second compressible member are on opposite sides of the opening. In some embodiments, the item is combined with a piece of child care equipment. The piece of child care equipment may be a play gym, a play yard, a playpen, a swing, a baby bouncer, a shopping cart liner, a stroller, a car seat, a booster seat, a play pad, a high chair, a changing pad or a changing pad cover.

DETAILED DESCRIPTION OF THE INVENTION

Embodiments of the invention include systems and methods of attaching toys or other items to child care equipment, and include pieces of child care equipment having features for attaching toys or other items.

In some embodiments, the piece of child care equipment is configured to include a track, such as a rod, and a sliding member that moves along the track. The sliding member is configured so that one or more toys or other items can be easily and releasably attached to it. Toys or other attached items can be interchanged and moved to different locations as desired. For example, the track may be suspended above a baby in a play gym, and toys hanging from the track may be moved to be within the baby's reach. The track may also be part of another kind of equipment, such as a pad or pillow, and attached toys or other items can be moved to a location where the child is lying. Other kinds of attachments may also be provided. The track may be completely embedded within the piece of equipment, such as within a fabric sleeve, with the clip sliding over a fabric sleeve. Alternatively, the track may be coupled to the equipment such that the track remains exposed. In this way, the clip slides directly over the track.

Figure 1A:
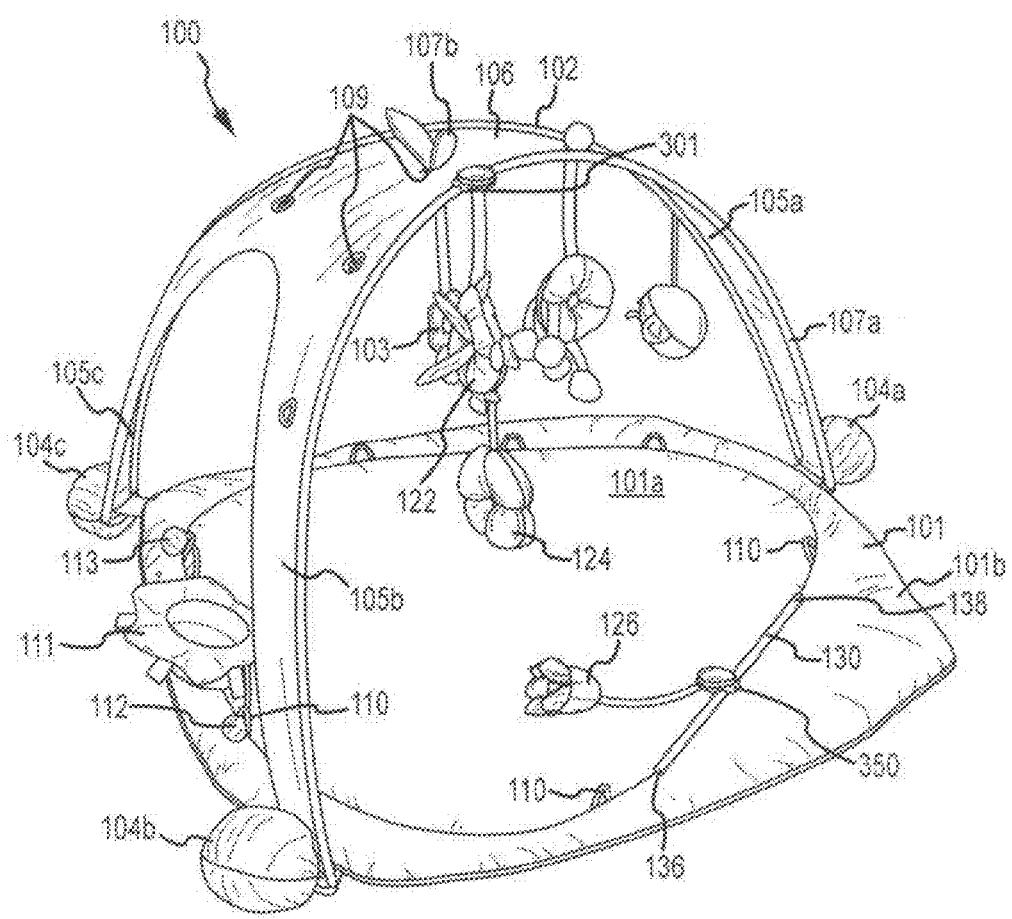
FIG. 1A shows an infant play gym in accordance with embodiments of the invention.

For example, FIG. 1A shows an infant play gym 100 in accordance with embodiments of the invention. Play gym 100 comprises a base pad 101, and a canopy 102. In one mode of use, play gym 100 is placed on a floor. Base pad 101 includes a padded center portion 101a and a padded peripheral portion 101b that forms an outer boundary for holding the baby. A seam is formed between portions 101a and 101b where the fabric from each of the portions is joined together. One convenient way to construct base pad 101 is by placing a batting on the fabric, then sewing the fabric together to form the various seams. The stitching between center portion 101a and peripheral portion 101b serves to limit the amount of shifting of the fill material. An infant is placed on base pad 101, and may interact with various toys or other items such as item 103 suspended from canopy 102 or attached to base pad 101. Play gym 100 thus provides a safe, comfortable, and convenient place for the baby to spend time, and also provides stimulation for the baby's entertainment and development. Play gym 100 may be especially useful for the care of infants who have not yet begun to crawl. Having items attached to play gym 100 keeps the baby's toys in a contained area and within the baby's reach.

Base pad 101 may be, for example, made of a soft cloth or fabric, and may be filled with padding such as foam or fiberfill padding or batting. Base pad 101 is preferably of a size suitable for holding a baby. For example, base pad 101 may be about 30 to 36 inches across, but other larger or smaller sizes may be used. Base pad 101 may be of any suitable shape, including round, oval, oblong, rectangular, or another shape.

Base pad 101 includes three attachment members 104a-c affixed to an edge portion of base pad 101. One of skill in the art will recognize that more attachment members may be provided. Attachment members 104a-c may be, for example, fabric-covered foam or fiberfill material in a ball shape, or another suitable shape. While attachment members 104a-c are preferably compressible, substantially rigid shapes could be used as well, for example plastic balls. Each of attachment members 104a-c may be affixed to base pad 101 by sewing a portion of the covering of the respective attachment member into an edge seam of base pad 101, by sewing a tether to both the attachment member and base pad 101, or by any other suitable means.

Canopy 102 is configured to arch over base pad 101, standing on three legs 105a-c, forming an arched support frame. Canopy 102 may reach a height of, for example, 12-24 inches over base pad 101, and may be used to hang toys or other items 103 within reach of a baby placed in play gym 100. One of skill in the art will recognize that more legs and other dimensions could be used. Canopy 102 comprises a surface sheet 106, which may be, for example, a fabric or plastic sheet, and may be of a single thickness, or comprise multiple thicknesses of one or more materials. Surface sheet 106 may be made of multiple pieces integrated together, and the pieces need not be of the same materials. Canopy 102 also includes at least two semi-rigid rods 107a and 107b embedded within canopy 102. Semi-rigid rods 107a and 107b may be, for example, made of a plastic, metal, or composite material, and may be round or another shape in cross section. Semi-rigid rods 107a and 107b are preferably stiff enough to remain substantially straight when unstressed, to lightly resist bending, and to regain substantial straightness when any bending force is removed. In one example embodiment, rods 107a and 107b are each about 28 inches long and about ¼ inch in diameter, and are made of unreinforced plastic. Other appropriate sizes may be used.

First ends of both rods 107a and 107b follow a first leg 105a of canopy 102 to its connection with base pad 101. Preferably, rods 107a and 107b are embedded within edges of surface sheet 106, but other placements may be used. A second end of first rod 107a also follows second leg 105b to its connection with base pad 101, and a second end of second rod 107b follows third leg 105c to its connection with base pad 101. Rods 107a and 107b thus support canopy 102 by virtue of their stiffness, similar to the way a tent may be supported by tent poles.

As described in greater detail hereinafter with reference to FIG. 3A, a clip 301 is slidingly engaged with rod 107a. Clip 301 may slide anywhere along rod 170a to adjust the position of one or more toys that are coupled to clip 301. This provides a convenient way for a caregiver to adjust the location of a toy relative to a child. For example, when removing the child from base pad 101, when changing a diaper or cleaning the baby, the caregiver can simply slide clip 301 along rod 107a to afford better access into the interior of the tent. To keep the child entertained, slip 301 may be slid such that the toy hangs over the arched support. Although shown attached to rod 107a, it will be appreciated that clip 301 may be coupled to any of the rods. Moreover, multiple clips could be attached to a single rod. Also, multiple toys may be chained together, such as toys 122 and 124 of FIG. 1A, to increase the length of the toy and provide a different arrangement for the toys that are suspended from base pad 101.

Base pad 101 may also include one or more tracks 130 that may be coupled anywhere along a top or side of base pad 101. Track 130 is a semi-rigid rod that may function similar to the rod 107a in supporting one or more clips 350 as described in greater detail hereinafter with reference to FIGS. 3C and 3D. As further illustrated in FIG. 1C, track 130 comprises a semi-rigid rod that is coupled to base pad 101 by a fabric sleeve 132. More specifically, sleeve 132 may comprise a fabric strip that has its lengthwise ends sewn into a seam 133 in base pad 101 to form a tube. Seam 133 is the seam that is formed when connecting portions 101a and 101b. The rod is slid through sleeve 132 and then the ends 136 and 138 of sleeve 134 are sewn down and incorporated into the seam. Prior to sewing the ends into the seam, clip 350 is inserted over the fabric sleeve. In the way, clip 350 will not detach from track 130. As another option, the ends of the rod may be held in pockets to secure the rod to base pad 101. In this way, a fabric sleeve would not be needed.

One or more toys 126 may be coupled to clip 350 in a manner similar to that described in connection with other embodiments. This allows items, such as toys to be removably coupled with base pad 101. Further, the location of the items can easily be adjusted by sliding them along track 130 using clip 350. For example, a toy can be moved to a mid portion of base pad 101 to provide easy access to the toy by the child. However, when the child needs to be removed from base pad 101, clip 350 may be slid to one side to move the toy. As another example, clip 350 may be slid along track 130 to place the toy in a different location to thereby provide a different environment within the play structure.

The fabric used to form fabric sleeve 132 should be durable because of friction caused by the slider clip when moving over the rod. The fabric, should be sufficiently durable so that the rod will not break through the fabric over time. Preferable fabrics include nylon fabrics. An especially good fabric is a denier nylon with or without a polyurethane coating.

Figure 1B:
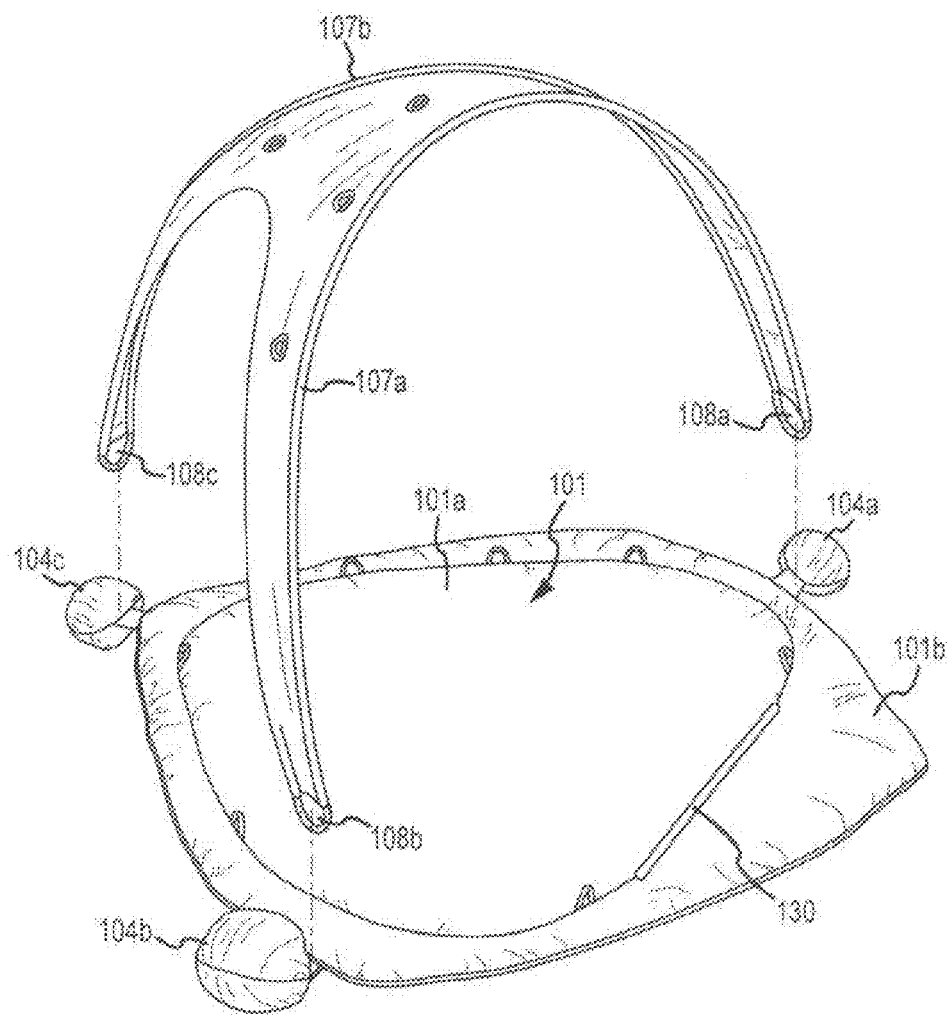
FIG. 1B shows the play gym of FIG. 1 with some of its parts separated, in accordance with embodiments of the invention.
Figure 1C:
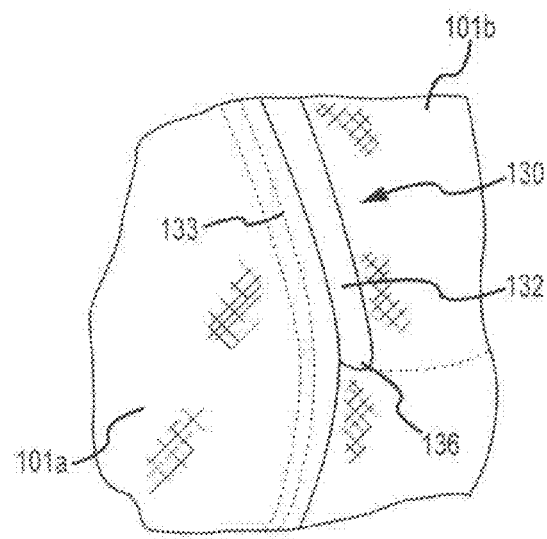
FIG. 1C is a magnified view of one end of a track of the play gym of FIG. 1A.

FIG. 1B shows canopy 102 separated from the rest of play gym 100. Canopy attachment loops 108a-c are placed at the lower ends of legs 105a-c. Loops 108a-c are configured to engage the attachment members 104a-c to attach canopy 102 to base pad 101. To make the attachment, each attachment member is passed through its respective loop. If attachment members 104a-c are compressible, each attachment member may be compressed to pass through its corresponding loop and then allowed to re-expand. Canopy attachment loops 108a-e may also be stretchable, so that when the loops are unstretched, the loops are smaller than the attachment members. This arrangement may help ensure a secure attachment of canopy 102 to base pad 101, but also allow for easy disassembly of play gym 100. As another option, loops 108a-c may each comprise two straps with ends having a hook and loop fastener material. In this way, the two straps may be wrapped about the attachment members 104a-c and then secured to each other about their respective ends.

Play, gym 100 may comprise one or more openings for attaching items 103 to play gym 100. For example, surface sheet 106 may include spaced apart holes 109, which may be reinforced by stitching around the perimeter of the hole or by other means. In another example, base pad 101 or canopy 102 may include loops such as item attachment loops 110 shown in FIG. 1. These holes and loops may be used to attach various toys, such as, for example, the toy in FIG. 2. However, the holes and loops can also be used with traditional toy links, also referred to as "C" clips or "C" links, to which various items may be attached.

Figure 2:
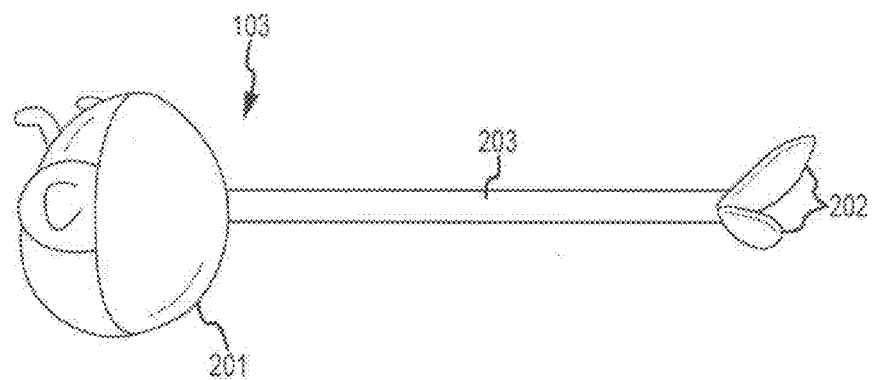
FIG. 2 shows an example item that may be attached to the play gym of FIG. 1.

FIG. 2 shows an example item 103 that may be attached to play gym 100. In this example, item 103 is a ball configured to attach to play gym 100, but many different kinds of items may be configured to attach to play gym 100, including such items as a toy, a block, a pyramid or other geometric shape, a doll, a teething ring, an item comprising a mirror, a toy shaped like an animal or insect, a toy shaped like a plant or flower, or another suitable item. Preferably, items attached to play gym 100 are selected to be entertaining and stimulating to an infant placed in play gym 100.

As is shown in FIG. 2, item 103 includes a main body 201 and a compressible member 202 connected to the main body 201. In this example, compressible member 202 is connected through tether 203, but other connection arrangements may be used. Compressible member 202 may have any suitable shape, such as a ball shape, a block shape, a pyramid shape or other geometric shape, a button shape, a leaf or flower shape, an animal shape, a shape reminiscent of wings, or another shape. The shapes may or may not incorporate sound, light or vibration features. Compressible member 202 is preferably somewhat larger in its uncompressed state than holes 109 or item attachment loops 110. Item 103 may then be attached to play gym 100 by squeezing compressible member 202 through one of holes 109 or item attachment loops 110 and allowing compressible member 202 to re-expand, providing a secure but easily removable connection. This attachment system has the additional advantage that the materials involved may be soft and pliable and all of the parts may be relatively large, resulting in a safe environment for the infant.

Figure 3A:
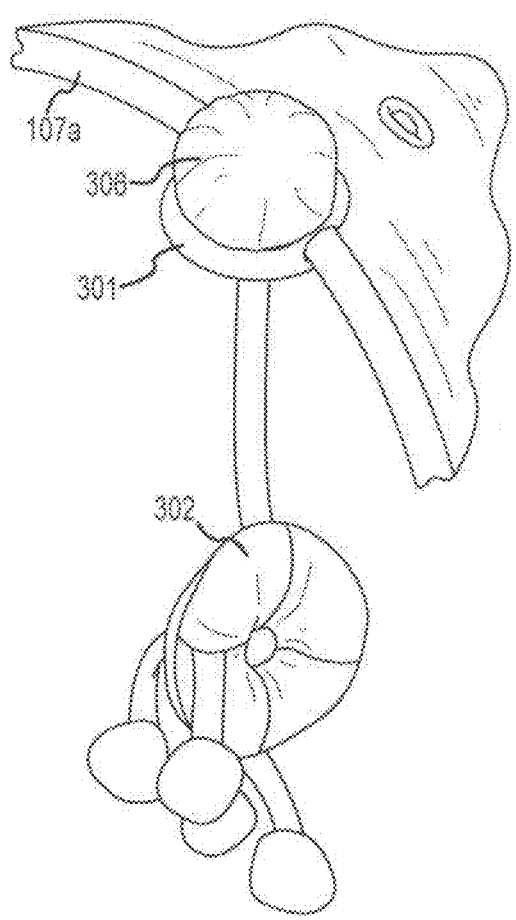
FIG. 3A illustrates an attachment of an item in accordance with another embodiment.

FIG. 3a illustrates another embodiment of an attachment of an item 302 to play gym 100. In this embodiment, clip 301 is slidingly engaged with rod 107a. One or more clips such as clip 301 may be engaged with any or all rods of canopy 102. Preferably, rod 107a is embedded in play gym 100 so that it is accessible for engagement with clip 301. For example, rod 107a may be embedded by wrapping rod 107a in a portion of surface sheet 106. In that configuration, rod 107a may be thought of as residing in a tubular pocket sewn into surface sheet 106. Not all of the rod need be wrapped or embedded. Even if part of a rod is wrapped, some of the rod may be left exposed. In some embodiments, the portion of surface sheet 106 wrapping rod 107a may be made of a woven nylon or other durable fabric, to provide a suitable amount of friction to clip 301, and to resist wear.

Figure 3B:
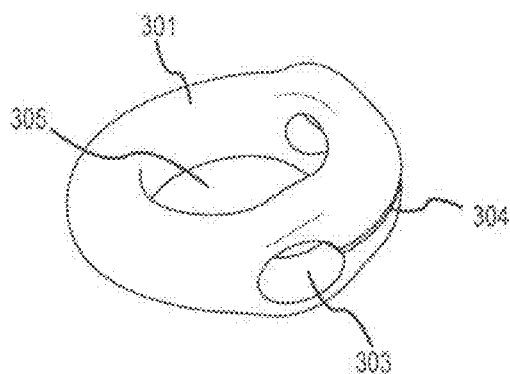
FIG. 3B illustrates a clip in accordance with embodiments of the invention.

FIG. 3b illustrates clip 301 in isolation. Clip 301 is generally toroidal, but need not be perfectly toroidal. A slotted passage 303 is provided at one side of clip 301. Slotted passage 303 is configured to slidingly engage a rod such as rod 107a. The rod and slotted passage may be any size, so long as passage 303 is sized so that clip 301 is easily slid along the rod, but will maintain its position on the rod when left at rest. This kind of sliding fit may be facilitated by the natural compliance of a portion of surface sheet 106 that may be wrapped around the rod, and by the split configuration of passage 303. Clip 301 is preferably substantially rigid so that it is not reasonably removable from the rod without sliding clip 301 past an end of the rod.

Once clip 301 is, engaged with rod 107a (or another rod) the fabric or other material wrapping rod 107a may engage with slot 304 of passage 303, and limit the rotation of clip 301 around rod 107a. Hole 305 in clip 301 provides an opening configured for attaching items to play gym 100. For example, compressible member 306 of item 302 may be passed through hole 305 to hang item 302 from canopy 102. Multiple clips 301 may be provided on play gym 100, and one or more clips may be provided on any or all semi-rigid rods used to support a canopy. Any oral clips 301 mounted on canopy 102 may be easily moved to adjust the positions of items such as item 302 attached to canopy 102 using clips 301.

It will be appreciated that many variations are possible in the configurations of the items to be attached to a piece of child care equipment such as play gym 100.

For example, referring again to FIG. 1, item 111 may comprise a mirror surface (which may be surrounded by suitable padding) to allow the child to see a reflection of himself or herself. Item 111 also illustrates another variation. Item 111 includes two compressible members 112 and 113, which are passed through two of item attachment loops 110, to further constrain the position of item 111. In another example, item 302 shown in FIG. 3A has a main body in the shape of an animal. Other items may have main bodies shaped like insects, plants, flowers, geometric shapes, or other objects that may entertain or stimulate the child.

In some embodiments, an item attached to a piece of child care equipment may generate sound. For example, a ball or other item may be filled with a material that makes a crackling sound when the ball is squeezed, encouraging the child to interact with the item. An attached item could include an electronic sound generating device that plays music, animal sounds, tells a story, or generates some other kind of sound when the item is squeezed, caused to move, or otherwise activated. In addition, an item may also incorporate a light feature or a vibration feature which can be activated by movement or a switch, also encouraging the child to interact with the item.

Figure 3C:
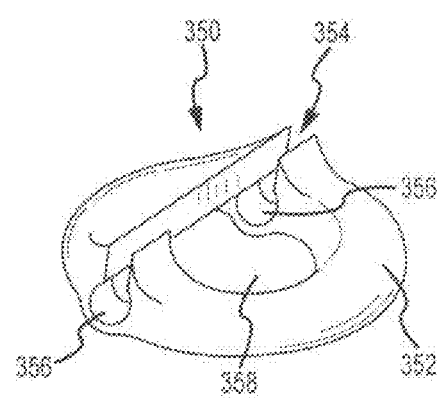
FIG. 3C is a bottom perspective view of an alternative clip according to the invention.
Figure 3D:
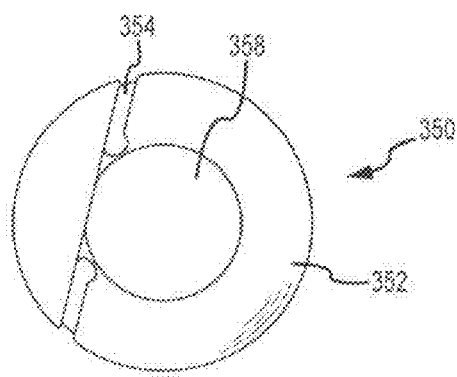
FIG. 3D is a bottom plan view of the clip of FIG. 3C.

FIGS. 3C and 3D illustrate clip 350 of FIG. 1A in greater detail. Clip 350 comprises a clip body 352 that is generally toroidal in geometry. Clip body 352 has a slot 354 leading to a passage 356 through which the rod will slide. Slot 354 is wide enough to prevent the fabric sleeve to slide through it. Passage 356 is sized to be just large enough so that it can smoothly slide over the rod and fabric sleeve. If passage 356 is too large, clip 350 will be too loose and will not easily slide, and may be able to separate from the rod. Conversely, if it is too small, then it will bind against the sleeve and/or rod making movement difficult. Thus, the rod should be small enough that it can be wrapped in the nylon fabric forming the sleeve and still have the clip slide, but not so small that the clip snaps off the rod and presents a safety hazard. The passage in clip 301 may be sized in a similar manner. Clip 350 also defines a central opening 358 where a compressible member of a toy may be place similar to other embodiments described herein.

Another feature of clip 350 is that slot 354 is generally perpendicular to the clip body, while with clip 301 the slot 304 is it is parallel to the clip body. This permits clip 350 to be generally parallel to the base 101 as illustrated in FIG. 1A so that it does not stick up and interfere with the baby's play. With clip 301, the clip body is generally aligned with the fabric on the arched support. While the clip body does extend from the rod, this does not interference with the baby's play and also allows the toy to more easily hang from the arched support. In some cases, clips may be constructed where the slot is at different angles relative to the clip body, such as 15 degrees, 30 degrees, 45 degrees, 60 degrees and the like, to permit the clip body to be at different angles relative to the adjacent fabric or base layer.

Many variations are also possible in the shapes of the compressible members used to attach items to the child care equipment. For example, compressible member 202 shown in FIG. 2 may be reminiscent of leaves, animal ears, or wings. Compressible member 306 shown in FIG. 3A is in a simple ball shape. Other possible shapes include a flattened ball or button shape, other geometric shapes, leaf and flower shapes or animal shapes.

Figure 4:
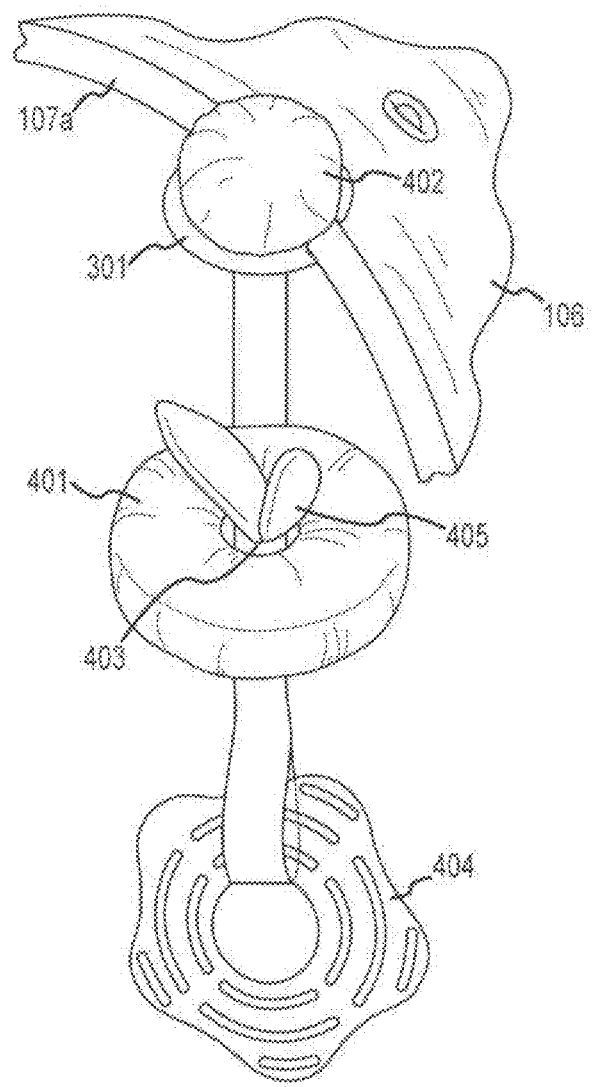
FIG. 4 shows an item attachment in accordance with another example embodiment.

FIG. 4 shows another example item 401 attached through a clip 301 engaged with rod 107a. In this example, item 401 includes a button-shaped compressible member 402 engaged with ring 301. The main body of item 401 is generally toroidal or donut shaped having an opening 403. A second item 404 is suspended from opening 403 in item 401. In this example, second item 404 includes a teething ring, and also includes a compressible member 405 in a shape reminiscent of leaves.

Attachment systems and methods according to embodiments of the invention may be used with a variety of child care equipment. Play gym 100 shown in FIG. 1A is but one example. Other kinds of equipment that may embody the invention include, without limitation, a play yard, a playpen, a swing, a baby bouncer, a shopping cart liner, a stroller, a car seat, a booster seat, a high chair, a play pad, a changing pad and a changing pad cover.

Figure 5:
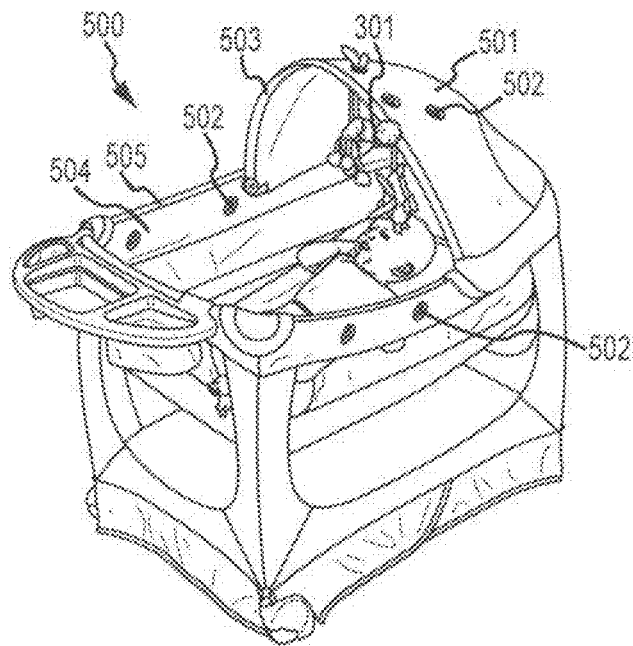
FIG. 5 shows a play yard in accordance with embodiments of the invention.

In one example, FIG. 5 shows a play yard 500 in accordance with embodiments of the invention. A play yard is a device similar to a traditional playpen, and is designed to provide a safe and constrained space for a child to spend time. A play yard may be placed, for example, in a corner of a room, or even outdoors when it is desired that the child accompany a group on a picnic or other outing. Play yard 500 includes features for attaching toys or other items. For example, play yard 500 includes a dome 501, which may include holes 502 for attaching items as previously described. An edge of dome 501 may include an embedded semi-rigid rod 503 and a clip 301 slidingly engaged with rod 503 for attaching items. Other portions of play yard 500 may also include openings or rods. For example, a wall or side 504 of play yard 500 may include holes 502, an embedded semi-rigid rod 505, or both; or the bottom of the play yard may include an embedded semi-rigid rod. Other examples of play yards or other play structures that may include such attachment systems are described in U.S. Pat. No. 7,290,303, and Published U.S. Application No. 2007/0271703 and 2002/0042953, incorporated herein by reference.

Figure 6:
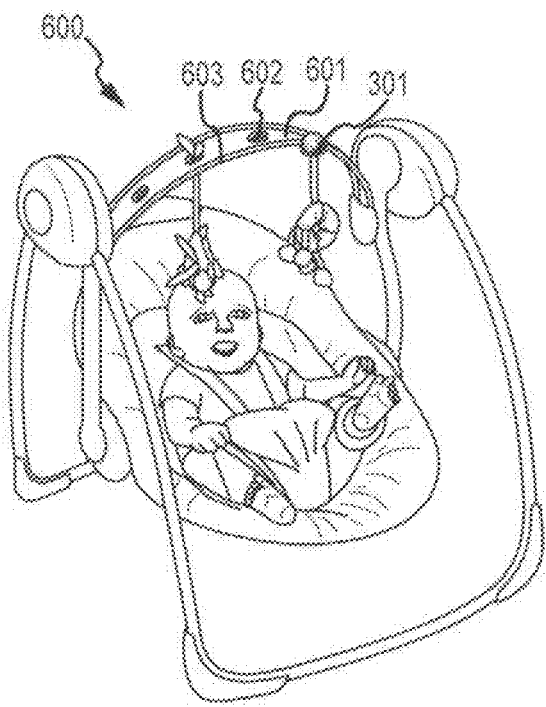
FIG. 6 shows a swing in accordance with embodiments of the invention.

In another example, FIG. 6 shows a swing 600 in accordance with embodiments of the invention. Example swing 600 includes an arched support frame 601 that includes holes 602 in a surface sheet and an embedded semi-rigid rod 603 for attaching items, for example using clip 301. Swing 600 may be used, for example, to provide a place for a baby to relax, with the swinging motion providing a comfort and enjoyment for the baby. The items suspended from arched support frame 601 provide additional entertainment and stimulation.

Figure 7:
FIG. 7 shows a bouncer in accordance with embodiments of the invention.

FIG. 7 shows a bouncer 700 in accordance with embodiments of the invention. A bouncer is a device used in a manner similar to a swing, but provides a bouncing motion rather than a swinging motion. Bouncer 700 also includes an arched support frame 701 having holes 702 in a surface sheet and an embedded semi-rigid rod 703, for mounting items using a clip 301.

Figure 8:
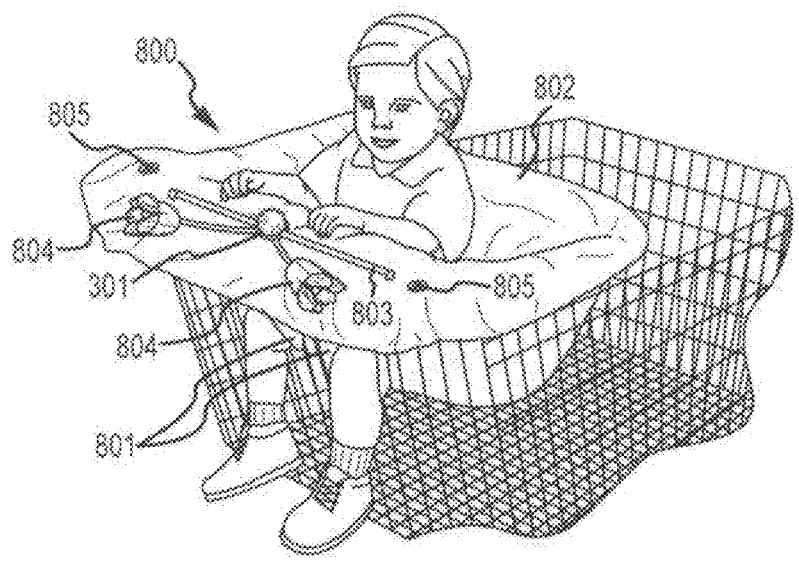
FIG. 8 shows a shopping cart liner in accordance with embodiments of the invention.

FIG. 8 shows a shopping cart liner 800 in accordance with embodiments of the invention. Shopping cart liner 800 is configured to nest in the child seat portion of a shopping cart to provide a clean liner over unsanitary surfaces. Liner 800 also provides protective soft surfaces for a child to encounter, rather than the hard, cold materials of which the shopping cart itself is usually made. Similar liners may be constructed for strollers, child car seats, high chairs, booster chairs, or other items in which a child may be placed, and one of skill in the art will recognize that the attachment features of shopping cart liner 800 may be adapted to other kinds of liners as well.

Figure 8A:
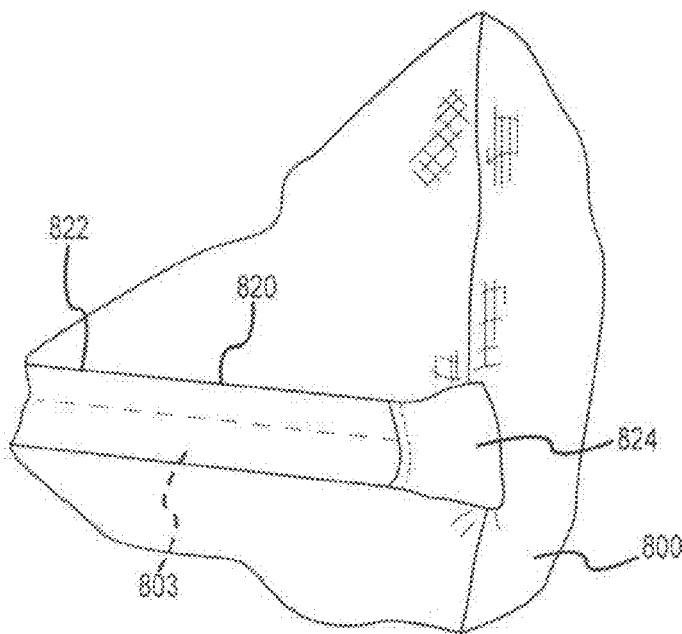
FIG. 8A is a magnified view of one end of a track of the cart liner of FIG. 8.

Shopping cart liner 800 includes leg holes 801 and a padded shell 802. A rod 803 is embedded in a portion of shopping cart liner 800 that a child faces when the liner is in use. As in other embodiments, rod 803 may be embedded by wrapping it in a fabric sleeve 820 or other sheet sewn into shopping cart liner 800, or may be embedded in some other way. As illustrated in FIG. 8A, fabric sleeve 820 is sewn into a seam 822 of liner 800 such that it forms a tube into which rod 803 may be inserted. After inserting rod 803 into the sleeve, each end 824 of the sleeve is folded back and then sewn onto itself as well as to the liner 800 as illustrated in FIG. 8A. Alternatively, an additional piece of fabric can be sewn over the ends and to the liner to insure that the ends of rod 803 will not poke through the sleeve. A clip 301 is slidingly engaged with rod 803, and toys or other items 804 are attached to shopping car liner using compressible members passed through the hole in clip 301. Typically, slider clip 301 is inserted over rod 803 and sleeve 820 prior to sewing ends 824 back on themselves to insure that clip 301 will remain attached to rod 803. In this example, both items 804 are shaped like flowers, and both are attached through the same opening in clip 301. Shopping cart liner may also have holes 805 through which other items may be attached using the methods described above. When attached to shopping cart liner 800, items 804 provide entertainment and stimulation to a child riding in the shopping cart, and because they are attached, are not likely to be dropped or lost.

Figure 9:
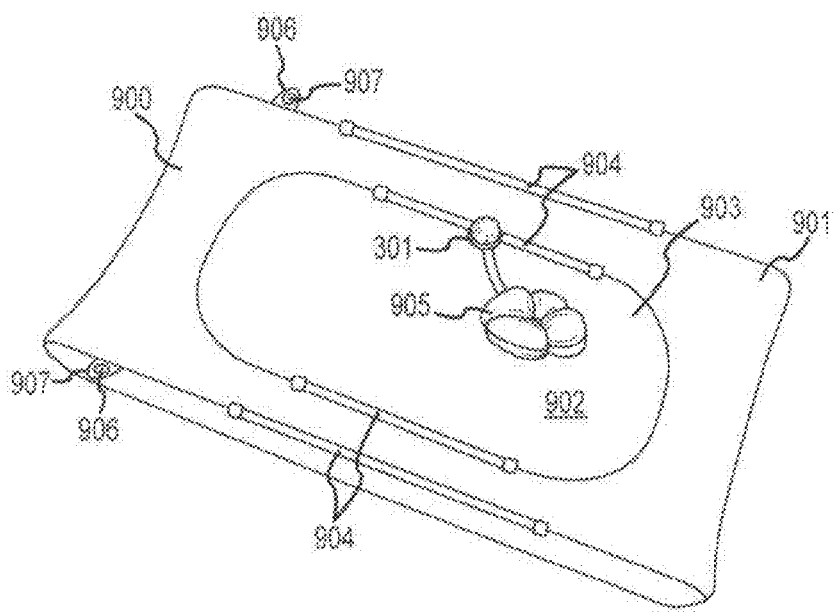
FIG. 9 shows a changing pad in accordance with embodiments of the invention.

FIG. 9 shows a changing pad 900 in accordance with embodiments of the invention. A changing pad is a soft pad of a convenient size and shape for holding an infant while its diaper is changed. Example changing pad 900 includes a cover 901 stretched over the outer surface of pad 900 in a manner similar to a fitted sheet over a mattress. Optionally, a protective liner 902 may be placed on top of cover 901. This may be constructed of a waterproof material to protect pad 900. Changing pad 900 also includes features for attaching items in accordance with the systems and methods described above. For example, one or more rods 904 may be embedded in various seams of cover 901, either at interior seams around opening 903 or at outer edges of changing pad 900. Rods 904 may encompass only a portion of a particular seam, as is shown in FIG. 9, or may encompass all of one or more seam. Rods similar to rods 904 may be embedded in other ways in changing pad 900 as well. Preferably, at least one clip 301 is slidingly engaged with each embedded rod. (Only one clip 301 is shown in FIG. 9 for clarity.) Items such as item 905 may be attached through the holes of any or all of the clips, as described previously. Changing pad 900 may also include tabs 906 protruding from cover 901 and having holes 907, providing additional or alternative attachment sites. Other kinds of pads, for example play pads, may be used in child care, and one of skill in the art will recognize that attachment features described above in relation to changing pad 900 may be adapted for use in other kinds of pads as well.

In some embodiments, an arch or an arm may be suspended over the changing pad in a manner similar to the play yards, swings and bouncers described herein. This arch or arm may include a flexible semi-rigid rod as in other embodiments to which a slider clip may be attached. In this manner, various items may be suspended over the changing pad. It could also include holes or loops through which the toys described herein may be attached.

The slider clips, rods, tracks, as well as the openings and loops for receiving compressible toys that are described herein may be incorporated into a variety of other products, such as on a crescent shaped pillow, including those described in U.S. Pat. Nos. 5,261,134; 5,661,861; 6,038,720; 6,055, 687; 6,685,024; 6,434,770; 6,671,908; 7,017,212; 6,279,185;

6,412,128; 7,451,508; 7,127,760; 6,944,898; 7,587,773; 7,472,443; and 7,404,222, incorporated herein by reference, and on slipcovers, including the slipcovers described in U.S. Pat. Nos. 6,453,493; 6,625,828; 6,851.143; 7,000,274; and 7,146,663, incorporated herein by reference. As another example, the attachment systems described herein may be used to attach items such as a pacifier, a pocket (such as to hold a cell phone or bottle), or the like to a large piece of equipment. As further examples, the attachment systems described herein may be used in connection with other equipment such as a walker, a jumper (that hangs in a doorway with elastic straps hooked onto a seat so baby can jump up and down), a pram or stroller, a baby exerciser or rocking saucer (like those sold by Evenflo and ExerSaucer), a baby activity center (such as those similar to the ExerSaucer, but without the saucer-shaped bottom), a toddler chair, a bassinet or crib, a crib mobile (having the slider system and/or holes in the mobile canopy), a crib bumper, a car seat organizer (such as a pocket organizer which fits over the back of the front seat), a storage basket, a storage bin or toy chest, a diaper bag, a baby carrier, including front or back baby carriers, a baby sling, an infant bath tub, a bath tub infant seat or a bath tub accessory with a suction cup, a baby bib, a book for baby (where the slider clip may be incorporated into the spine of the book or across the cover), a rocking chair, a glider chair, or the like.

The invention has now been described in detail for the purposes of clarity and understanding. However, those skilled in the art will appreciate that certain changes and modifications may be practiced within the scope of the appended claims.

What is claimed is:

1. A child care equipment system, comprising:
a piece of child care equipment comprising a canopy formed by a surface sheet and a plurality of semi-rigid rods coupled to the surface sheet;
an opening in the piece of child care equipment, wherein the opening comprises at least one of:
(i) a canopy opening extending through the surface sheet of the canopy for receiving a portion of an item; and
(ii) a clip opening in a clip slidingly engaged with one of the plurality of semi-rigid rods, the clip opening for receiving a portion of an item;
an item to be attached to the piece of child care equipment via the opening, the item including a main body larger than the opening, and the item also including a compressible member connected to the main body with a tether, wherein the compressible member is larger than the opening when the compressible member is in an uncompressed state, and the compressible member is configured to be compressible to a size smaller than the opening so that the compressible member can be passed through the opening so that the compressible member and the main body are visible on opposite sides of the opening and the tether extends at least partially through the opening; and
a pad coupled to the canopy so that the canopy arches over the pad, wherein the pad includes a track comprising a rod-like member and a clip defining an opening that is slidingly engaged with the track.

2. The system of claim 1, wherein at least one of the semi-rigid rods is embedded in the surface sheet.

3. The system of claim 1, wherein the piece of child care equipment is selected from the group consisting of a play gym, a play yard, a playpen, a swing, a baby bouncer, a stroller, a changing pad, and a changing pad cover.

4. The system of claim 1, wherein the compressible member has a shape selected from the group of shapes consisting of a ball shape, a block shape, a pyramid shape, a button shape, a shape reminiscent of leaves, a shape reminiscent of a flower, an animal shape, and a shape reminiscent of wings.

5. The system of claim 1, wherein the item to be attached comprises an item selected from the group consisting of a toy, a doll, a ball, a mirror, a block, a pyramid, a teething ring, a toy shaped like an animal or insect, a toy shaped like a plant or flower, an item that generates sound, an item that generates vibration, and an item that generates light.

6. The system of claim 1, wherein the item to be attached is a first item to be attached and wherein the first item to be attached comprises an item opening configured for attachment of a second item having a compressible member to the first item by passage, through the item opening, of the compressible member of the second item, thereby forming a chain of toys.

7. The system of claim 1, wherein the item to be attached is a first item, the system further comprising a second item, the first and second items both being attached to the piece of child care equipment via the same opening.

8. A piece of child care equipment, comprising:
a canopy formed by a surface sheet and a plurality of semi-rigid rods coupled to the surface sheet; and
a substantially rigid clip having a passage that is slidingly engaged with one of the plurality of rods, the clip comprising an opening for attaching an item to the piece of child care equipment; and
a base pad positioned under and coupled to the canopy, wherein the base pad comprises a fabric, a padding material enclosed by the fabric, and a plurality of compressible members spaced apart and affixed to an edge portion of the base pad via a tether, wherein the compressible members comprise a fabric and a foam or filler material enclosed by the fabric, wherein the canopy further comprises a plurality of attachment loops that each define an opening, and wherein each attachment loop is configured to receive one of the plurality of compressible members laterally through the loop to couple the canopy to the base pad such that the compressible members remain exposed on the piece of child care equipment, and wherein each compressible member is larger than the respective opening when the compressible member is in an uncompressed state, and the compressible member is configured to be compressible to a size smaller than the opening so that the compressible member can be passed through the opening so that the compressible member and the main body are visible on opposite sides of the opening and the tether extends at least partially through the opening.

9. The piece of child care equipment of claim 8, wherein at least one of the plurality of semi-rigid rods is embedded in the surface sheet, and wherein the rigid clip slides over the surface sheet.

10. The piece of child care equipment of claim 8, wherein at least a portion of at least one of the semi-rigid rods remains exposed on the canopy.

11. The piece of child care equipment of claim 8, wherein the piece of child care equipment is selected from the group consisting of a play gym, a play yard, a playpen, a swing, a baby bouncer, a shopping cart liner, a stroller, a car seat, a booster seat, a play pad, a high chair, a changing pad, and a changing pad cover.

12. The piece of child care equipment of claim 8, in combination with an item to be attached to the piece of child care equipment, the item comprising a main body larger than the opening in the clip, and the item including a compressible member connected to the main body, wherein the compressible member is larger than the opening when the compressible member is in an uncompressed state, and the compressible member is configured to be compressible to a size smaller than the opening so that the compressible member can be passed through the opening so that the compressible member and the main body are visible on opposite sides of the opening.

13. A play gym for a child, the play gym comprising:
a base pad, the base pad including at least three compressible members spaced apart and affixed to an edge portion of the base pad via tethers, wherein the base pad comprises a fabric and a padding material; and
a canopy having at least three legs and configured to arch over the base pad, the canopy comprising a surface sheet and at least first and second semi-rigid rods embedded in the surface sheet, each semi-rigid rod having a respective first end and a respective second end, the first ends of the first and second rods following a first of the at least three legs, the second end of the first rod following a second of the at least three legs, and the second end of the second rod following a third of the at least three legs, the canopy further comprising a respective canopy attachment loop at an end of each leg, each canopy attachment loop configured to receive one of the at least three compressible members laterally through the loop by squeezing the compressible member to reduce its outer dimensions to attach the canopy to the base pad such that the at least three compressible members remain exposed on the play gym
wherein each compressible member is larger than the respective opening when the compressible member is in an uncompressed state, and the compressible member is configured to be compressible to a size smaller than the opening so that the compressible member can be passed through the opening so that the compressible member is visible on opposite sides of the opening and the tether extends at least partially through the opening.

14. The play gym of claim 13, wherein each canopy attachment loop is stretchable.

15. The play gym of claim 14, wherein each canopy attachment loop is smaller than its corresponding compressible member when the loop is in an unstretched state and the compressible member is in an uncompressed state.

16. The play gym of claim 13, further comprising an opening configured to accept a portion of an item to be attached to the play gym.

17. The play gym of claim 16, wherein the opening is formed by a mechanism selected from the group consisting of a hole in the surface sheet, an item attachment loop of fabric sewn into either the surface sheet or the base pad, and a hole through a substantially rigid clip, the clip slidingly engaged with one of the semi-rigid rods in the canopy.

18. The play gym of claim 13, wherein the base pad further includes a track comprising a rod-like member and a clip slidingly engaged with the track and comprising an opening for attaching an item to the base pad.

19. The play gym of claim 18, further comprising an item attached to the play gym, wherein the attached item comprises an item selected from the group consisting of a toy, a doll, a ball, a mirror, a block, a pyramid, a teething ring, a toy shaped like an animal or insect, a toy shaped like a plant or flower, an item that generates sound, an item that generates light, and an item that generates vibrations.

20. The system of claim 1, wherein the opening comprises the clip opening in a clip slidingly engaged with one of the plurality of semi-rigid rods.

21. The system of claim 20, wherein the clip comprises a generally toroidal body that extends in a plane, a passage that extends at least partially through the clip body and that is configured to receive the semi-rigid rod and a slot in communication with the passage, wherein the slot extends into the body generally perpendicular to the plane.

22. The system of claim 2, wherein the canopy defines at least three arched legs, where the surface sheet of each canopy leg comprises two edges, and wherein a semi-rigid rod extends along each edge.

23. The piece of child care equipment of claim 8, wherein the clip comprises a generally toroidal body that extends in a plane and a slot within the body, wherein the slot extends into the body generally perpendicular to the plane.

24. A piece of child care equipment comprising:
a base pad comprising a track and a clip slidingly engaged with the track and defining an opening for attaching an item to the piece of child care equipment; and
a canopy that arches over and is coupled to the base pad, wherein the canopy comprises a plurality of semi-rigid rods that extend upwardly from the base pad;
wherein the base pad further comprises a plurality of compressible members that are spaced apart and affixed to an edge portion of the base pad via a tether, wherein the canopy further comprises a respective canopy attachment loop at an end of at least some of the plurality of semi-rigid rods, wherein each canopy attachment loop defines an opening that is configured to receive one of the plurality of compressible members laterally through the loop to couple the canopy to the base pad such that the plurality of compressible members remain exposed on the piece of child care equipment, and wherein each compressible member is larger than the respective opening when the compressible member is in an uncompressed state, and the compressible member is configured to be compressible to a size smaller than the opening so that the compressible member can be passed through the opening so that the compressible member is visible on opposite sides of the opening and the tether extends at least partially through the opening.

25. A piece of child care equipment, comprising:
a canopy comprising at least one track, wherein the at least one track comprises a semi-rigid rod-like member; and
a substantially rigid clip associated with the at least one track and configured to slide relative to the at least one track, the clip comprising an opening for attaching an item to the piece of child care equipment
a base pad positioned under and coupled to the canopy, wherein the base pad comprises a plurality of compressible members spaced apart and affixed to an edge portion of the base pad, wherein the canopy further comprises a plurality of attachment loops that each define an opening, wherein each attachment loop is configured to receive one of the plurality of compressible members laterally through the loop to couple the canopy to the base pad such that the compressible members remain exposed on the piece of child care equipment, wherein each compressible member is larger than the respective opening when the compressible member is in an uncompressed state, and the compressible member is configured to be compressible to a size smaller than the opening so that the compressible member can be passed through the opening so that the compressible member is visible on opposite sides of the opening.

26. The system of claim 25, wherein the clip comprises a generally toroidal body that extends in a plane, a passage that extends at least partially through the clip body and that is configured to receive the semi-rigid rod and a slot in communication with the passage, wherein the slot extends into the body generally perpendicular to the plane.

27. The piece of child care equipment of claim 25, in combination with an item to be attached to the piece of child care equipment, the item comprising a main body larger than the opening in the clip, and the item including a compressible member connected to the main body, wherein the compressible member is larger than the opening when the compressible member is in an uncompressed state, and the compressible member is configured to be compressible to a size smaller than the opening so that the compressible member can be passed through the opening so that the compressible member and the main body are visible on opposite sides of the opening.

28. The play gym of claim 25, wherein the base pad includes a track and a clip slidingly engaged with the track and comprising an opening for attaching an item to the base pad.

29. A play gym for a child, the play gym comprising:
   a base pad, the base pad including at least three compressible members spaced apart and affixed to an edge portion of the base pad; and
   a canopy having at least three legs and configured to arch over the base pad, the canopy comprising a surface sheet and at least first and second semi-rigid rods embedded in the surface sheet, each semi-rigid rod having a respective first end and a respective second end, the first ends of the first and second rods following a first of the at least three legs, the second end of the first rod following a second of the at least three legs, and the second end of the second rod following a third of the at least three legs, the canopy further comprising a respective canopy attachment loop at an end of each leg, each canopy attachment loop configured to receive one of the at least three compressible members laterally through the loop to attach the canopy to the base pad such that the at least three compressible members remain exposed on the play gym
   wherein the base pad further includes a track comprising a rod-like member and a clip slidingly engaged with the track and comprising an opening for attaching an item to the base pad.

* * * * *